Oct. 2, 1962   E. CHILDERS ETAL   3,056,648
PROCESS FOR EXTRACTING CYANIDES
Filed Aug. 26, 1960   3 Sheets-Sheet 1
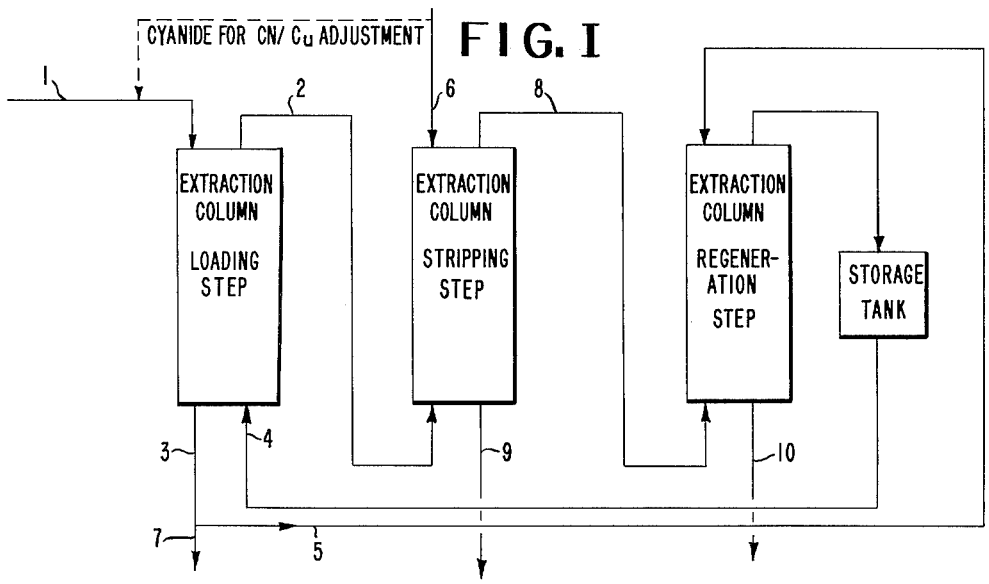
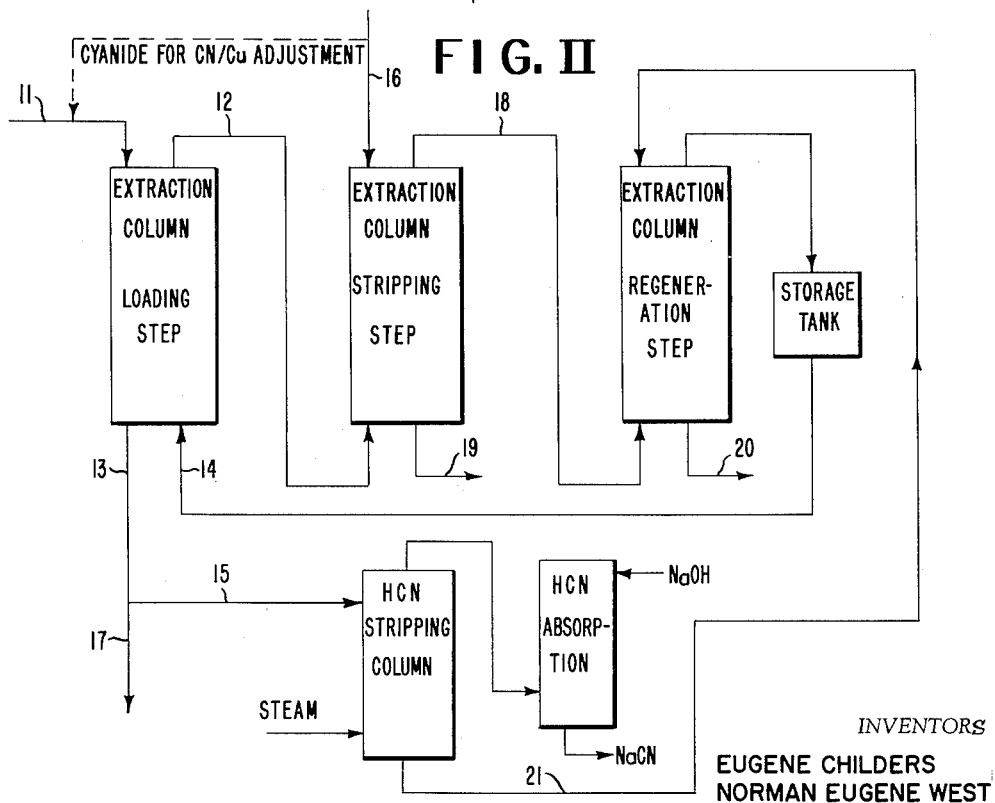
INVENTORS
EUGENE CHILDERS
NORMAN EUGENE WEST
BY  *A. McAlevy*
ATTORNEY

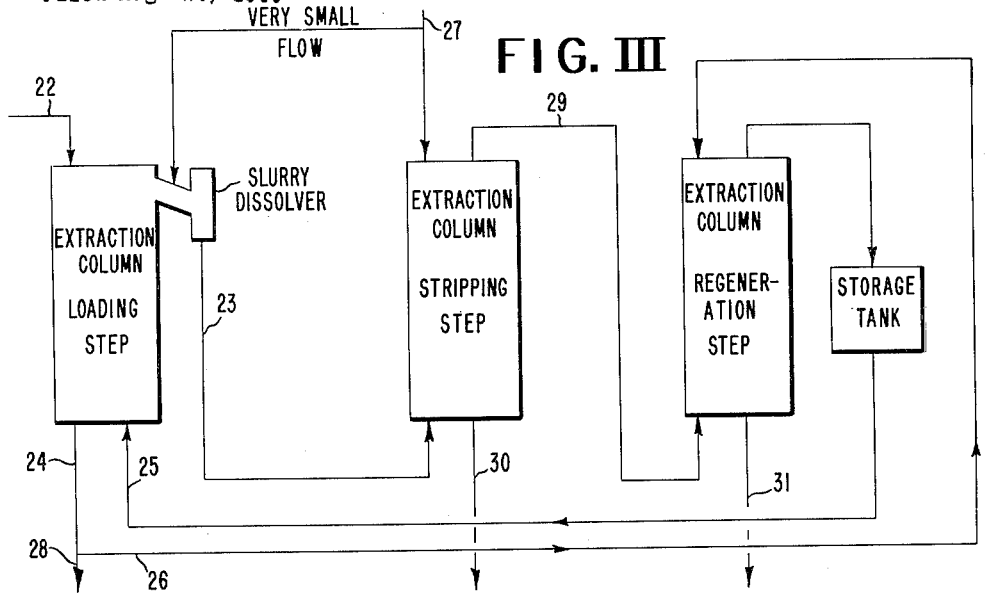
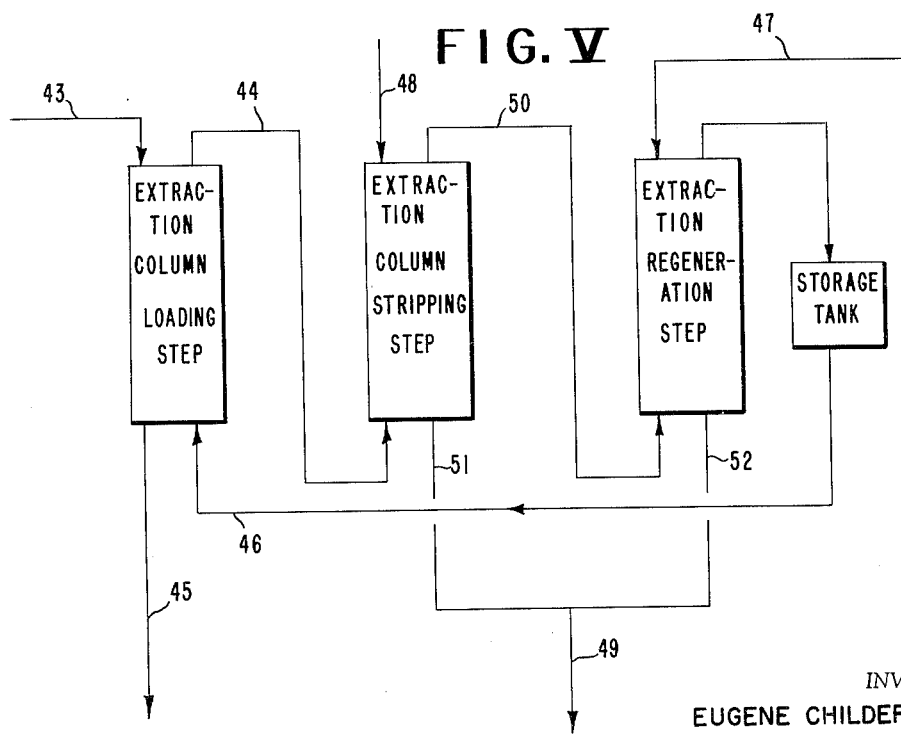

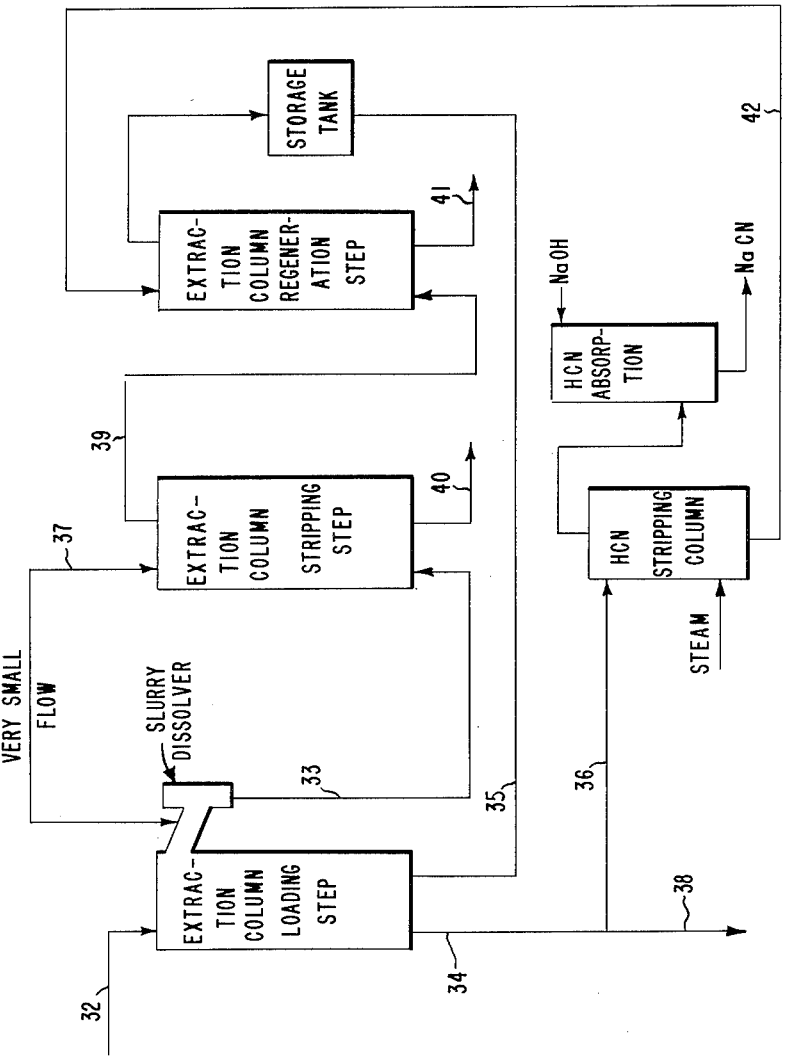

United States Patent Office 3,056,648
Patented Oct. 2, 1962

3,056,648
PROCESS FOR EXTRACTING CYANIDES
Eugene Childers and Norman Eugene West, Victoria, Tex., assignors to E. I. du Pont de Nemours and Company, Wilmington, Del., a corporation of Delaware
Filed Aug. 26, 1960, Ser. No. 52,263
6 Claims. (Cl. 23—77)

This invention relates to the extraction of metal-containing anions from aqueous alkali metal halide solutions and more particularly to the recovery of complex metal cyanides from alkali metal halide solutions by extraction with liquid organic quaternary ammonium compounds.

It has been known heretofore that many valuable metal-containing anions could be extracted from aqueous acidic solutions with liquid amines which were substantially insoluble in water and therefore formed a two-phase system with the said acidic aqueous solutions.

Under the influence of acid, liquid amines are converted to the ammonium form:

$$R.NH_2 + H^+X^- \rightarrow RNH_3^+X^-$$

The positively charged cation is found to have a varying affinity for anions. In general, the affinity for the complex metal-containing anions is greater than the affinity for simple anions, such as halide ions. Thus, if the liquid amine compounds are contacted with an acidic solution containing complex metal-containing anions, exchange will take place:

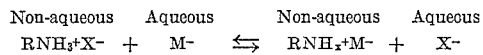

provided the metal-containing complex M⁻ has a very much greater affinity for the cation than the X⁻ ion, the metal will be extracted by the organic phase with great efficiency, and may thus be removed from the aqueous solution by simple mechanical separation of the aqueous and non-aqueous phases.

In many respects this process is analogous to the use of weakly-basic anion exchange resins. However, in the latter case, as with all solid phase ion exchange processes, the process of exchange is relatively slow. In liquid extraction processes, the exchange reaction is virtually instantaneous.

The use of the liquid exchange process also offers many practical advantages; it is possible to employ a continuous ion exchange process with conventional chemical plant equipment, and without the disadvantageous mechanical attrition encountered when similar processes employing solid ion exchage resin particles are used. Because of the greater rate of ion transfer, the equipment required for a given production rate may be smaller. Material costs are also far less.

Extraction with liquid amines is confined to acid solutions as described above. For many purposes, it is greatly preferred to operate in neutral or even basic solutions. For example, in the case of the recovery of copper as complex cyanide, the nature of the complex cyanide is a function of the pH, and cyanide ion concentration. In a brine solution containing copper and cyanide, a relationship exists between copper, cyanide and HCN concentrations, and pH. The term R, defined as follows, has been found to be important.

$$R = \left(\frac{[CN]}{[Cu]}\right) - 1$$

in which [CN] is the total molar concentration of cyanide exclusive of HCN and [Cu] is the total molar concentration of copper salts. The solubility of copper in strongly acid brine solutions, that is at a pH of about pH 1, is about 1000 parts per million. At pH values lower than pH 4 and at values of R less than 1, the copper is largely precipitated from brine solution as insoluble cuprous cyanide. At values of R of 1 or greater, the copper exists as the freely soluble complexes $[Cu(CN)_4]^{3-}$, $[Cu(CN)_3]^{2-}$, and $[Cu(CN)_2]^-$, and thus may be recovered from more concentrated solution.

Dicyanobutene is an important intermediate in the manufacture of nylon. It is synthesized by the reaction of dichlorobutenes with alkali metal cyanides in aqueous solution maintained at a pH less than pH 7, and in the presence of a catalyst, preferably sodium cuprocyanide.

When the reaction is complete, the product is extracted with benzene to remove the organic material, leaving an aqueous waste, hereinafter called "raffinate," containing about 0.5% to 1% by weight of copper. A typical analysis of such a raffinate is shown in Table I.

TABLE I

Typical Composition of a Raffinate From the Synthesis of Dicyanobutene

| | |
|---|---|
| Copper | 0.5–1.0% by weight. |
| Iron | 50 parts per million. |
| Sodium chloride | 25% by weight. |
| R | 1.0–1.5 |
| Organics (chloroform extractables) | 0.5% by weight. |
| Benzene | 500 parts per million. |

The pH of typical raffinates is normally maintained between pH 7 and pH 4. At pH values greater than pH 7, residual organic materials tend to degrade; at pH values lower than pH 4 the copper is precipitated because R reaches a very low value.

In order to make the synthesis of dicyanobutene by the aforesaid method commercially attractive, it is essential to recover the expensive copper salts with great efficiency in a form suitable for reuse as a catalyst, and return the recovered catalyst to the dicyanobutene synthesis reactors. It is also highly desirable to separate the copper salts from the iron salts in the raffinate during this recovery procedure. Iron salts are introduced into the reactors as trace impurities in the various reactant streams. Generally speaking, the iron salts tend to be removed from the aqueous waste together with the copper, and are therewith returned to the reaction vessels. In this event, the concentration of iron salts tends to increase steadily in concentration. Iron salts have a deleterious effect on the cyanation reaction, tending to cause formation of black tarry material in the reactor, and decreasing the yield of dicyanobutene. These harmful effects largely can be avoided if the iron salts are removed from the catalyst recycle stream.

It is an object of the present invention to provide a process for the recovery of complex cuprocyanide ions from alkali metal halide solutions.

Another object is to provide a process for the recovery of copper from alkali halide solutions which does not involve the extensive consumption of chemical reagents. Other objects will become apparent hereinafter.

The above objects are achieved by extracting the copper solution with a solution of a brine-insoluble quaternary ammonium halide dissolved in an inert liquid organic diluent. The copper solution should be preferably at a pH in the range of from 8 to 4 and have an R value of from 1 to 3 and preferably from 1.0 to 2.0, where: R is defined herein above, and also contains alkali metal halide salts in a concentration preferably greater than 1 N. The non-aqueous phase resultant from this extraction is thereafter treated with a solution of alkali metal cyanide having a concentration preferably greater than 1 N, an aqueous solution containing purified sodium cuprocyanide being recovered, and the quarternary ammonium compound in the non-aqueous phase being converted to the cyanide form. The quaternary ammonium compound in the cyanide form is then treated with a solution of an alkali metal halide in a concentration of at least 1 N whereby an aqueous layer containing sodium cyanide is recovered together with a water-insoluble non-aqueous solution of quaternary ammonium halide suitable for reuse as an extractant for cuprocyanide ions.

Most quaternary ammonium compounds have an extremely great affinity for water. Compounds in which the substituent radicals are relatively small are soluble in water. Higher molecular weight quaternary compounds are less soluble, but have a strong tendency to form stable emulsions which cannot be separated into their component phases by any ordinary means.

We have discovered that quaternary ammonium compounds having a molecular weight sufficiently great to be sparingly soluble in water can be used for the extractive exchange of complex cuprocyanide anions from solutions containing a high concentration of halide salts. Under such conditions, the quaternary ammonium halides exhibit very little tendency to form emulsions, are surprisingly insoluble in the aqueous medium, and show an extremely surprising efficiency in the extraction of many anions from solution, despite the high concentration of halide ions which would be expected to reverse the exchanging reaction. Because these organic compounds are permanently in ionic form by virtue of their chemical structure, they may be employed in acidic, basic, or neutral solutions.

By a substantial concentration of halide salts is meant a concentration of at least 1 N and preferably a concentration of 4 N or greater. The cation associated with the halide ion may be an alkali or an alkaline earth metal or any other cation which forms soluble halide salts but which does not form complex anions under such conditions.

The hydrocarbon substituents of the quaternary nitrogen atom may be alkyl, aryl, cycloalkyl or aralkyl groups. The substituents should have one or preferably two or three large radicals. In general, the total number of carbon atoms should be from about 15 to 45 carbon atoms, in order to insure insolubility in the aqueous medium without the quaternary compound having an unduly high molecular weight, which tends to reduce the exchange capacity of the salt per unit weight.

In general, the saturated alkyl or aralkyl groups are preferred as substituents to olefinic radicals, since the latter are more readily degraded by oxidation processes. Aralkyl groups, such as the benzyl group, are particularly valuable as substituents when an aromatic solvent, such as benzene, toluene or xylene, is employed as the inert liquid organic diluent.

It will be realized that it is by no means essential to employ quaternary ammonium compounds which are pure chemical species in the practice of this invention, but that mixtures of suitable compounds may be employed. Thus, many quaternary ammonium compounds are available at low cost as articles of commerce which are prepared from the mixed fatty acids from natural fats and oils and their hydrogenation products; for example, dimethyl di-"coco" ammonium chloride, wherein "coco" refers to the mixed radicals obtained from the fatty acids present in coconut oil or dimethyl di-"hydrogenated tallow" ammonium chloride, where the expression "hydrogenated tallow" refers to the mixed organic radicals obtained from the fatty acids of hydrogenated tallow.

The inert organic diluents, which are preferred in the practice of this invention, are the lower paraffins or mixtures thereof, such as kerosene, cycloalkanes; such as cyclohexane; aromatic solvents, such as benzene; toluene or xylene; and chlorinated hydrocarbon solvents, such as chlorform; and tetrachloroethylene.

Paraffinic solvents are extremely inert and have very little solubility in water, however, they also have limited solvating power for the quaternary ammonium compounds employed.

The aromatic solvents tend to have a greater solubility in water, but also dissolve the necessary quaternary ammonium compounds more readily. These solvents decrease the tendency to form emulsions when the quaternary ammonium salt has one or more aralkyl substituents, and hence are extremely valuable for use with such compounds.

The chlorinated solvents and especially chloroform have an especially marked tendency to inhibit the formation of emulsions between the quarternary ammonium salts and aqueous solutions containing high concentrations of halide ions. The tendency for solutions of quaternary ammonium halide solutions to form emulsions with brine solutions is shown in Table II. The data in Table II were obtained by vigorously mixing 10% solutions of the listed quarternary ammonium compound in the selected solvent with an equal volume of raffinate from the dicyanobutene synthesis, then measuring the time taken for complete separation to occur.

Further improvement in the process with regard to decreasing the tendency of quaternary ammonium compounds to emulsify the aqueous and non-aqueous phase may be obtained by adding a small quantity of a higher, water-insoluble alcohol, generally containing from 10–16 carbon atoms, such as isodecanol to the quaternary ammonium solution. Concentrations of the alcohol in the quaternary solution should generally be in the range of from 1% to 5% by weight.

TABLE II

| Quaternary ammonium extractant | Solvent | Time for complete separation |
|---|---|---|
| Methyl trilauryl ammonium chloride. | Benzene | 1–16 hours. |
| | Carbon tetrachloride | 2–16 hours. |
| | Chloroform | 1 minute. |
| Methyl tri "hydrogenated tallow" ammonium. | Benzene | 1–16 hours. |
| | Chloroform | 40 seconds. |
| Dimethyl di ($C_{20}$-$C_{22}$) ammonium chloride. | Benzene | Emulsified. |
| | Carbon tetrachloride | Do. |
| Dimethyl di "coco" ammonium chloride. | Benzene | Stable emulsion at interface. |
| Dimethyl lauryl benzyl ammonium chloride. | Chloroform | 1 min., 10 secs. |
| | Benzene | 1 min., 15 secs. |
| | Carbon tetrachloride | 1 min., 15 secs. |
| Dimethyl di "hydrogenated tallow" ammonium chloride. | Benzene | Stable emulsion. |

With regard to the temperature at which the process of this invention should be conducted, generally ambient temperature may be employed although somewhat higher temperature, up to 70° C., may be used. At yet higher temperature, there is some tendency to degrade the quaternary ammonium compounds employed in the extraction.

The species of cuprocyanide ion present in solution is a function of both pH and R. At very high pH and R values, the species $[Cu(CN)_4]^{3-}$ is predominant. At pH values, less than pH 1.5, substantially all of the copper is precipitated as the cuprous cyanide, CuCN. At values of the pH between pH 8 and pH 4, complex cuprocyanide ions $[Cu(CN)_3]^{2-}$ and $[Cu(CN)_2]^-$ are in equilibrium with the $[Cu(CN)_4]^{3-}$ ion; the equilibrium depending mainly on the R value.

Generally it has been established that $[Cu(CN)_4]^{3-}$ ions have little affinity for quaternary ammonium compounds, and that a pH value between pH 8 and pH 4 and R values of from 1 to 3 and preferably from 1.0–2.0 should be employed for the extraction of copper from solutions containing halide ions and cyanide. The above R values apply to the halide solution before extraction.

It has also been found that the solubility of the various quaternary ammonium salts depends on the cation present. Generally, the solubility of the salts is ordered:

Halide>cyanide>cupocyanide

Under certain circumstances insoluble quarternary ammonium cuprocyanide complexes are formed in the extraction step. This is true especially when the R value is less than about 2. However, the greatest extraction efficiency is generally obtained with low R values, so that operation under such conditions may be desirable. The solids formed in such extractions at low R values tend to form a slurry in the oil phase and can be removed therewith without serious difficulty. In one modification of this invention, the extraction is performed at R values of less than 2, and a slurry of quaternary ammonium cuprocyanide in the non-aqueous phase is withdrawn from the extraction column. The quaternary ammonium cuprocyanide is then solubilized by the addition of a small amount of sodium cyanide solution to the slurry immediately on leaving the raffinate extraction apparatus in order to facilitate transfer of the material to the stripping apparatus.

By the extraction step, cuprocyanide ions are removed from the alkali metal halide solution into the water-insoluble organic phase whence they are separated from the decopperized saline solution mechanically. The copper may then be recovered from the organic layer containing quaternary ammonium cuprocyanide by contacting the organic material with a strong aqueous solution of an alkali metal cyanide. The alkali metal cyanide solution should be at least 1 N and preferably 4 N in order to obtain a high R value which favors stripping of the copper salts from the organic layer and also to maintain a high ionic strength which tends to prevent the formation of emulsions. The products of this second extraction step are an aqueous solution containing alkali metal cuprocyanide and a water-insoluble solution of quaternary ammonium cyanide.

Finally the quaternary ammonium cyanide is returned to the halide form by contacting the quaternary ammonium cyanide solution with an aqueous solution of an alkali metal halide having a concentration of at least 1 N and preferably greater. An aqueous solution of alkali metal cyanide is obtained together with a non-aqueous solution of quaternary ammonium halide suitable for re-use in the extraction of metallic anions.

A wide variety of equipment may be used to perform the contacting between aqueous and non-aqueous phases in the loading, stripping and regeneration steps. On a laboratory scale, the aqueous and water-insoluble solutions may be contacted in a separatory funnel. On a larger scale, spray columns, packed towers, sieve plate columns, mixer-settlers or like devices known in the chemical engineering art may be used to contact the liquids intimately. The liquids may then be permitted to separate under the influence of gravity, or centrifugation may be employed.

It will be understood that the raffinate brine to be extracted may be adjusted with regard to the pH and the value of R to obtain optimum operative efficiency by the addition of small quantities of acid, alkali, or alkali metal cyanide, and by the removal of HCN by boiling the raffinate, or by steam-stripping or by like procedure well known to those skilled in the art.

The invention will be better understood from the more detailed discussion of the recovery of copper from the waste brine or raffinate resultant from the synthesis of dicyanobutene, which form a specific embodiment of this invention.

EXAMPLE I

A semiworks extraction unit was constructed which comprised 3 spray columns employed as contacting units for loading, stripping and regenerating a quaternary ammonium salt solution. The solution to be treated was the aqueous waste or raffinate resultant from the synthesis of dicyanobutene having an R value of between 2 and 3 and a pH in the range between pH 5.5 and 6.

In the accompanying drawing, FIGURE I, there is shown a schematic diagram of the equipment employed. Referring to the diagram the various streams in the semiworks are shown as numbers from 1 to 10 inclusive.

A solution containing 10% by weight of dimethyl lauryl benzyl ammonium chloride dissolved in benzene was employed as the extractant.

The flow of the various streams together with analyses for copper and cyanide (as CN) are shown in Table III. In the first column of Table III are given numbers corresponding to the stream number in the appended drawing FIGURE I, the stream being identified in the second column. The regeneration is accomplished by feeding about 25% of the decopperized waste brine from the loading extraction column to the regeneration column. Due to the presence of cyanides in the decopperized waste the process proved to be only about 90% efficient for the removal of copper from the waste.

The recycle sodium cyanide stream and waste brine stream were found to contain as little as 1 part per million of quaternary ammonium compound. The recycle catalyst solution was found to contain about 50 parts per million of quaternary ammonium compound which proved to be mechanically entrained and could be reduced to a level between 5 and 8 parts per million by permitting a two-hour settling period prior to use of the catalyst. This surprisingly low loss of valuable quaternary ammonium compound renders the process of this invention extremely attractive economically.

TABLE III
EXAMPLE I
*Semiworks Material Balance*

| Stream No. | Description | Total flow, lbs./hr. | Copper in stream | | Total cyanide (as CN) in stream | |
|---|---|---|---|---|---|---|
| | | | P.p.m. | lbs./hr. | Percent | Lbs./hr. |
| 1 | Raffinate | 124 | 9,660 | 1.20 | 1.23 | 1.52 |
| 2 | Quaternary cuprocyanide in benzene | 179 | 6,330 | 1.13 | [1] 0.4 | [1] 0.72 |
| 3 | Brine exit loading | 124 | 1,130 | 0.14 | 0.33 | 0.41 |
| 4 | Recycle quaternary chloride (10%) in Bz | 179 | 248 | 0.044 | 0.13 | 0.23 |
| 5 | Brine to regeneration | 42 | 1,130 | 0.048 | 0.33 | 0.14 |
| 6 | Sodium cyanide (26%) | 73 | 0 | 0 | | |
| 7 | Waste brine | 82 | 1,130 | 0.093 | 0.33 | 0.27 |
| 8 | Quaternary cyanide in benzene | 179 | 356 | 0.064 | 0.88 | 0.57 |
| 9 | Recycle catalyst to cyanation | 73 | 13,600 | 0.992 | | |
| 10 | Recycle cyanide to cyanation | 42 | 1,720 | 0.072 | 2.88 | 1.21 |

[1] Difficult to measure.

EXAMPLE II

In Example I waste brine was employed, after decopperization in the extraction column, for the regeneration of the quaternary ammonium compound, i.e., conversion of the dimethyl lauryl benzyl ammonium cyanide in benzene solution to a benzene solution of dimethyl lauryl benzyl amonium chloride suitable for re-use in the extraction of copper. The waste brine contained cyanide as explained hereinabove and hence relatively insufficient conversion of the quaternary ammonium compound to the chloride form resulted. In turn, since the removal of copper is dependant upon the R value, relatively poor efficiency in the overall extraction process was experienced. Accordingly a steam stripping column was interposed in the line conveying the waste brine from the extraction column to the regeneration column, the cyanide being removed as the volatile HCN, which in turn was removed by absorption in caustic soda solution.

In the accompanying drawings, FIGURE II is a schematic diagram showing the use of steam stripping in the supply of decopperized waste brine for regeneration. The several process streams are identified by numbers 11 to 21 inclusive. The nature of these streams together with analyses for copper and cyanide are shown in Table IV. The improved efficiency of extraction due to the use of a regeneration brine free from cyanide will be apparent from comparison of this data with that given in Table III.

solubilized by the addition of a minor amount of sodium cyanide solution prior to passing the non-aqueous product to the stripping column. The small amount of aqueous material thus introduced is removed with the other aqueous recycle catalyst solution in the stripping column.

In this example decopperized waste brine at the loading column was employed without steam stripping for regeneration of 10% dimethyl lauryl benzyl ammonium cyanide solution in benzene.

The accompanying drawing, FIGURE III, is a schmatic diagram of the process. Table V gives an analysis of the various product streams, numbered from 22 to 31 in FIGURE III.

TABLE IV

EXAMPLE II

*Semiworks Material Balance*

| Stream No. | Description | Total flow, lbs./hr. | Copper in stream | | Total cyanide (as CN) in stream | |
|---|---|---|---|---|---|---|
| | | | P.p.m. | lbs./hr. | Percent | Lbs./hr. |
| 11 | Raffinate | 118 | 6,600 | 0.79 | 0.90 | 1.06 |
| 12 | Quaternary cuprocyanide in benzene | 159 | 5,850 | 0.93 | [1] 0.57 | [1] 0.91 |
| 13 | Brine exit loading | 118 | 420 | 0.050 | 0.26 | 0.31 |
| 14 | Recycle quaternary chloride (10%) in Bz | 159 | 276 | 0.044 | 0.245 | 0.39 |
| 15 | Brine to HCN stripper | | 420 | | 0.26 | |
| 16 | Sodium cyanide (26%) | 52 | 0 | 0 | | |
| 17 | Waste Brine | | 420 | | 0.26 | |
| 18 | Quaternary cyanide | 159 | 440 | 0.071 | 0.82 | 0.31 |
| 19 | Recycle catalyst to cyanation | 52 | 15,200 | 0.79 | | |
| 20 | Recycle cyanide to cyanation | 21 | 1,870 | 0.039 | 6.94 | 1.46 |
| 21 | Brine to regeneration | 21 | 230 | 0.005 | 0.03 | 0.006 |

[1] Difficult to measure.

TABLE V

EXAMPLE III

*Semiworks Material Balance*

| Stream No. | Description | Total flow, lbs./hr. | Copper in stream | | Total cyanide (as CN) in stream | |
|---|---|---|---|---|---|---|
| | | | P.p.m. | Lbs./hr. | Percent | Lbs./hr. |
| 22 | Raffinate | 59 | 6,890 | 0.406 | 0.67 | 0.40 |
| 23 | Cuprocyanide in benzene | 77 | 3,900 | 0.30 | [1] 0.16 | [1] 0.12 |
| 24 | Brine exit loading | 59 | 64 | 0.003 | 0.054 | 0.03 |
| 25 | Recycle quaternary chlorine (10%) in Bz | 77 | 175 | 0.013 | <0.01 | <0.01 |
| 26 | Brine to regeneration | 9 | 64 | <0.001 | 0.054 | 0.005 |
| 27 | Sodium cyanide (26%) | 23 | 0 | 0 | | |
| 28 | Waste brine | 50 | 64 | 0.003 | 0.54 | 0.027 |
| 29 | Quaternary cyanide in benzene | 77 | 60 | 0.005 | 0.79 | 0.61 |
| 30 | Recycle catalyst to cyanation | 23 | 10,800 | 0.248 | | |
| 31 | Recycle cyanide to cyanation | 9 | 180 | 0.002 | 6.7 | 0.60 |

[1] Difficult to measure.

NOTE—Overall material balance here was poor because of process fluctuation; however, the aqueous stream analyses are believed to be representative of what the process can do.

EXAMPLE III

In the foregoing examples a relatively high R value was maintained in the raffinate feed, and the resultant dimethyl lauryl benzyl ammonium cuprocyanide was maintained in solution. In accord with the foregoing discussion it will be evident that the highest extraction efficiency is achieved with the lower R values. Using brine at a pH within the range of pH 4.5 to pH 5 and R value of <2, solids were produced in the loading column having the formula $R_4NCu_2(CN)_3$ which formed a slurry in the oil layer. This slurry could be withdrawn readily from the top of the column and the product

EXAMPLE IV

The conditions for this example were the same as those in Example III, except that the portion of the decopperized waste brine employed for the regeneration of the dimethyl lauryl benzyl ammonium cyanide solution was steam stripped in order to remove cyanide from the stream and thus improve the efficiency of the loading and regeneration steps, as in Example II.

The accompanying drawing, FIGURE IV, shows a schematic diagram of the process of Example IV. The process stream indicated by the number 32 to 42 are collected in Table VI together with an analysis of each stream for copper and for cyanide.

TABLE VI
EXAMPLE IV
*Semiworks Material Balance*

| Stream No. | Description | Total flow, lbs/hr. | Copper in stream P.p.m. | Copper in stream lbs./hr. | Total cyanide (as CN) in stream Percent | Total cyanide (as CN) in stream Lbs./hr. |
|---|---|---|---|---|---|---|
| 32 | Raffinate | 118 | 7,600 | 0.90 | 0.90 | 1.06 |
| 33 | Quaternary cuprocyanide in benzene | 159 | | | [1] 0.96 | [1] 1.59 |
| 34 | Brine exit loading | 118 | 7 | <0.001 | 0.033 | 0.039 |
| 35 | Recycle quaternary chloride (10%) in Bz | 159 | | | 0.055 | 0.087 |
| 36 | Brine to HCN stripper | 41 | 77 | | 0.033 | 0.014 |
| 37 | Sodium cyanide (26%) | 40 | 0 | 0 | | |
| 38 | Waste brine | 77 | 7 | <0.001 | 0.033 | 0.025 |
| 39 | Quaternary cyanide in benzene | 159 | | | 0.65 | 0.03 |
| 40 | Recycle catalyst to cyanation | 40 | 20,400 | 0.81 | | |
| 41 | Recycle cyanide to cyanation | 51 | 857 | 0.04 | 2.61 | 1.33 |
| 42 | Brine to regeneration | 51 | 7 | | 0.001 | <0.001 |
| | Steam condensed in HCN stripper | Ca. 10 | | | | |

[1] Difficult to measure.

Surprisingly it was also found that the process of this invention selectively recovered cuprocyanide ions over ferrocyanide ions. The recovered catalyst solution was found to be very largely free from deleterious iron salts and hence useable directly in the cyanation of dichlorobutene without further purification from iron impurities.

FIGURE V in the accompanying drawings is a schematic diagram of an experimental arrangement used for determining the relative efficiencies of iron and copper removal from dicyanobutene raffinate using extraction with dimethyl lauryl benzyl ammonium chloride solution. The relevant data are collected together in Table VII wherein the numbers 43 to 52 inclusive refer to the various process streams indicated by the corresponding number in the accompanying drawing, FIGURE V. From inspection of Table VII it will be apparent that the copper to iron ratio in the recovered catalyst is improved by a factor approximately ten-fold greater than that of the waste raffinate from which the copper is recovered, and that although the cyanide solution which is recovered from the regeneration column, and which may also be employed in the cyanation reaction, has a relatively low Cu/Fe ratio, the combined stream of recovered catalyst and sodium cyanide is improved approximately five-fold over the waste from the reaction.

TABLE VII
*Iron Balance*

| Stream No. | Description | Fe in stream P.p.m. | Fe in stream Lbs./hr. | Cu/Fe ratio (by weight) |
|---|---|---|---|---|
| 43 | Raffinate | 20 | 2.36×10⁻³ | 380 |
| 44 | Quaternary cuprocyanide in benzene | 11 | 1.75×10⁻³ | |
| 45 | Waste brine | 17 | 2.0 ×10⁻³ | 5 |
| 46 | Recycle quaternary chlorine (10%) in benzene | 9 | 1.43×10⁻³ | |
| 47 | Brine to regeneration | 0.26 | 1.2 ×10⁻⁵ | |
| 48 | Sodium cyanide (26%) in stripping | <2 | 5.8 ×10⁻⁵ | |
| 49 | Combined streams to cyanation | | | 1,840 |
| 50 | Quaternary cyanide in benzene | 9 | 1.43×10⁻³ | |
| 51 | Recycle catalyst to cyanation | 10 | 2.90×10⁻⁴ | 3,200 |
| 52 | Recycle cyanide to cyanation | 5 | 2.4 ×10⁻⁴ | 208 |

The process of the invention has been described more particularly with respect to the cyanation of dichlorobutene to produce dicyanobutene, an intermediate in the production of polyhexamethylene adipamide. However it will be realized that the waste brines which result from the cyanation of any allylic halide with aqueous acidic sodium cyanide in the present of a copper catalyst may be treated for the recovery of copper by the process of this invention.

Many other modifications of this invention will occur to those skilled in the art.

We claim:

1. A process for recovering copper catalyst solution from waste solutions containing cuprocyanide ions and having a pH in the range between pH 4 and pH 8 and having R values of 1 to 3 where R is defined by the expression $$R = \frac{[CN]}{[Cu]} - 1$$

in which [CN] is the total molar concentration of cyanide other than HCN and [Cu] is the total molar concentration of copper salts, said waste solutions containing alkali metal halide in a concentration of at least 1 N, which comprises the steps of: (1) extracting said waste solution with a substantially water-insoluble liquid solution of a quaternary ammonium halide in an inert organic diluent, said quaternary ammonium halide having four hydrocarbon substituents containing a total of from 15 to 45 carbon atoms and separating in said extraction a decopperized aqueous waste solution and a substantially water-insoluble phase containing quaternary ammonium cuprocyanide; (2) extracting said quaternary ammonium cuprocyanide solution recovered from the first step with a solution containing alkali metal cyanide in a concentration of at least 1 N and thereafter separating an aqueous solution containing substantially pure alkali metal cuprocyanide, said solution being suitable for use as a cyanation catalyst, and a non-aqueous solution of quaternary ammonium cyanide; and (3) extracting said quaternary ammonium cyanide with a solution containing an alkali metal halide in a concentration of at least 1 N and thereafter separating an aqueous solution containing alkali metal cyanide and a non-aqueous solution conting quaternary ammonium halide suitable for re-use in step (1).

2. A process for recovering copper catalyst solution from the waste brine resultant from the synthesis of dicyanobutene, said waste brine containing cuprocyanide ions and having a pH in the range of pH 4 to pH 8 and an R value of from 1 to 3 where R is defined by the expression $$R = \frac{[CN]}{[Cu]} - 1$$

in which [CN] is the total molar concentration of cyanide other than HCN and [Cu] is the total molar concentration of copper salts, which comprises the steps of: (1) extracting said waste brine with a substantially water-insoluble liquid solution of a quaternary ammonium chloride in an inert organic diluent, said quaternary ammonium chloride having four hydrocarbon substituents containing a total of from 15 to 45 carbon atoms, and thereafter separating a decopperized waste brine and a substantially water-insoluble phase containing quaternary ammonium cuprocyanide; (2) extracting said phase containing quaternary ammonium cuprocyanide with a solution containing sodium cyanide in a concentration of at least 1 N and thereafter separating an aqueous solution containing sodium cuprocyanide, said solution being suitable for reuse as a catalyst in the synthesis of dicyanobutene, and a substantially water-insoluble non-aqueous phase containing quaternary ammonium cyanide; and (3) extracting said phase containing quaternary ammonium cyanide with a solution containing sodium chloride in a concentration of at least 1 N and thereafter separating an aqueous phase-containing sodium cyanide and a non-aqueous phase containing quaternary ammonium chloride suitable for re-use in step (1).

3. A process for recovering copper catalyst solution from the waste brine resultant from the synthesis of dicynobutene, said waste brine containing cuprocyanide ions and having a pH in the range of pH 4 to pH 8 and an R value of from 1 to 3 where R is defined by the expression $$R = \frac{[CN]}{[Cu]} - 1$$

in which [CN] is the total molar concentration of cyanide other than HCN and [Cu] is the total molar concentration of copper salts, which comprises the steps of: (1) extracting said waste brine with a substantially water-insoluble liquid solution of a quaternary ammonium chloride in an inert organic diluent, said quaternary ammonium chloride having four hydrocarbon substituents containing a total of from 15 to 45 carbon atoms and thereafter separating a decopperized waste brine and a substantially water-insoluble phase containing quaternary ammonium cuprocyanide; (2) extracting said phase containing quaternary ammonium cuprocyanide with a solution containing sodium cyanide in a concentration of at least 1 N and thereafter separating an aqueous phase containing sodium cuprocyanide, said solution being suitable for reuse as a catalyst in the synthesis of dicyanobutene, and a substantially water-insoluble non-aqueous phase containing quaternary ammonium cyanide; and (3) extracting said phase containing quaternary ammonium cyanide solution with a part of the decopperized waste brine resultant from step (1) and thereafter separating an aqueous water-insoluble non-aqueous phase containing quaternary ammonium chloride suitable for reuse in step (1).

4. A process for recovering copper catalyst solution from the waste brine resultant from the synthesis of dicyanobutene, said waste brine containing cuprocyanide ions and having a pH in the range of pH 4 to pH 8 and an R value of from 1 to 3 where R is defined by the expression $$R = \frac{[CN]}{[Cu]} - 1$$

in which [CN] is the total molar concentration of cyanide other than hydrocyanic acid and [Cu] is the total molar concentration of copper salts, which comprises the steps of: (1) extracting said waste brine with a substantially water-insoluble liquid solution of a quaternary ammonium chloride in an inert organic diluent, said quaternary ammonium chloride having four hydrocarbon substituents containing a total of from 15 to 45 carbon atoms and thereafter separating a decopperized waste brine and a substantially water-insoluble phase containing quaternary ammonium cuprocyanide; (2) extracting said phase containing quaternary ammonium cuprocyanide with a solution containing sodium cyanide in a concentration of at least 1 N and thereafter separating an aqueous phase containing sodium cuprocyanide, said solution being suitable for reuse as a catalyst in the synthesis of dicyanobutene, and a substantially water-insoluble non-aqueous phase containing quaternary ammonium cyanide; and (3) extracting said phase containing quaternary ammonium cyanide with a solution obtained by steam-stripping hydrocyanic acid from the said decopperized waste brine resultant from step (1) and thereafter separating a substantially water-insoluble non-aqueous phase containing quaternary ammonium chloride suitable for reuse in step (1), and an aqueous phase containing sodium cyanide.

5. A process for recovering copper catalyst solution from the waste brine resultant from the synthesis of dicyanobutene, said waste brine containing cuprocyanide ions and having a pH in the range of pH 4 to pH 8 and an R value in the range of 1 to 2 where R is defined by the expression $$R = \frac{[CN]}{[Cu]} - 1$$

in which [CN] is the total molar concentration of cyanide other than hydrocyanic acid and [Cu] is the total molar concentration of copper salts, which comprises the steps of: (1) extracting said waste brine with a substantially water-insoluble liquid solution of a quaternary ammonium chloride in an inert organic diluent, said quaternary ammonium chloride having four hydrocarbon substituents containing a total of from 15 to 45 carbon atoms and thereafter separating a decopperized waste brine and a substantially water insoluble phase containing quaternary ammonium cuprocyanide in part as a slurry of solids; (2) solubilizing the said quaternary ammonium cuprocyanide by the addition of a minor amount of sodium cyanide solution having a concentration of at least 1 N as the said slurry leaves the extraction; (3) extracting said solubilized quaternary ammonium cuprocyanide solution with a solution containing sodium cyanide in a concentration of at least 1 N and thereafter separating an aqueous phase containing sodium cuprocyanide, said solution being suitable for reuse as a catalyst in the synthesis of dicyanobutene, and a substantially water-insoluble non-aqueous phase containing quaternary ammonium cyanide; and (4) extracting said phase containing quaternary ammonium cyanide with a solution obtained by steam-stripping hydrocyanic acid from part of the said decopperized waste brine resultant from step (1) and thereafter separating a substantially water-insoluble phase containing quarternary ammonium chloride suitable for reuse in step (1) and an aqueous phase containing sodium cyanide.

6. Process of claim 5 in which the quarternary ammonium chloride solution comprises a solution containing from 5% by weight to 20% by weight of dimethyl lauryl benzyl ammonium chloride in benzene.

References Cited in the file of this patent
UNITED STATES PATENTS

| | | |
|---|---|---|
| 2,877,250 | Brown et al. | Mar. 10, 1959 |
| 2,955,932 | Goren | Oct. 11, 1960 |

UNITED STATES PATENT OFFICE
CERTIFICATE OF CORRECTION

Patent No. 3,056,648 October 2, 1962

Eugene Childers et al.

It is hereby certified that error appears in the above numbered patent requiring correction and that the said Letters Patent should read as corrected below.

Column 1, line 50, for "exchage" read -- exchange --; column 4, TABLE II, first column, line 4 thereof, after "ammonium" insert -- chloride --; columns 7 and 8, TABLE IV, fourth column, line 1 thereof, for "6,600" read -- 6,700 --; same TABLE IV, seventh column, line 8 thereof, for "0.31" read -- 1.31 --; column 9, line 73, for "present" read -- presence --; column 10, line 56, for "contining" read -- containing --.

Signed and sealed this 19th day of February 1963.

(SEAL)
Attest:

ESTON G. JOHNSON
Attesting Officer

DAVID L. LADD
Commissioner of Patents